(12) United States Patent
Underwood et al.

(10) Patent No.: US 9,769,678 B2
(45) Date of Patent: Sep. 19, 2017

(54) NETWORK MONITORING AND ANALYSIS TOOL

(71) Applicant: 3RD BRAND PTE. LTD., Singapore (SG)

(72) Inventors: John Anthony Underwood, Makati (PH); Christopher Edward Keys, Makati (PH); Rainer Leinonen, Makati (PH); Markku Kero, Muntinlupa (PH)

(73) Assignee: 3RD BRAND PTE. LTD., Singapore (SG)

( * ) Notice: Subject to any disclaimer, the term of this patent is extended or adjusted under 35 U.S.C. 154(b) by 0 days.

(21) Appl. No.: 13/886,640

(22) Filed: May 3, 2013

(65) Prior Publication Data

US 2013/0242752 A1    Sep. 19, 2013

Related U.S. Application Data

(63) Continuation of application No. 13/497,391, filed as application No. PCT/SG2010/000330 on Sep. 7, 2010, now abandoned.

(51) Int. Cl.
*G06F 15/177*  (2006.01)
*G06F 15/16*   (2006.01)
(Continued)

(52) U.S. Cl.
CPC ............. *H04W 24/02* (2013.01); *H04L 43/06* (2013.01); *H04L 43/0864* (2013.01);
(Continued)

(58) Field of Classification Search
CPC ..... H04W 24/02; H04W 24/06; H04W 24/10; H04L 43/0864; H04L 43/06;
(Continued)

(56) References Cited

U.S. PATENT DOCUMENTS 5,889,955 A * 3/1999 Shinozaki ........... G06F 11/3414
                                                     709/224
6,446,028 B1 * 9/2002 Wang .......................... 702/186
(Continued)

FOREIGN PATENT DOCUMENTS

CN   1400774 A   3/2003
CN   1524233 A   8/2004
(Continued)

*Primary Examiner* — Edan Orgad
*Assistant Examiner* — Vanneilian Lalchinthang
(74) *Attorney, Agent, or Firm* — MKG LLC

(57) ABSTRACT

A method for determining the performance of a communications network said method comprising the steps of transmitting a message from a mobile device to at least one server, each server within the at least one servers being configured to direct the message back to the mobile device; receiving at the mobile device the messages returned by each of the at least one server; calculating a time differential between transmission of the message by said mobile device and receipt of the messages, returned by each server of the at least one server, by said mobile device; and forwarding the calculated time differential to a primary server selected from the at least one server for storage is disclosed.

17 Claims, 5 Drawing Sheets

(51) Int. Cl.
*G06F 15/173* (2006.01)
*H04W 24/02* (2009.01)
*H04L 12/26* (2006.01)
*H04W 24/06* (2009.01)
*H04W 24/10* (2009.01)

(52) U.S. Cl.
CPC ........... H04L 43/106 (2013.01); H04W 24/06 (2013.01); *H04W 24/10* (2013.01)

(58) Field of Classification Search
CPC ........ H04L 43/106; G06F 15/00; G06F 11/34; G06F 15/16; G06F 15/173
USPC ......................................................... 370/241
See application file for complete search history.

(56) References Cited

U.S. PATENT DOCUMENTS

| | | | |
|---|---|---|---|
| 7,216,164 B1 | 5/2007 | Whitmore et al. | |
| 7,346,678 B1* | 3/2008 | Zhu | G06F 11/3495 709/204 |
| 7,945,656 B1* | 5/2011 | Remaker | 709/224 |
| 8,166,203 B1* | 4/2012 | Yang | G06F 17/30657 707/698 |
| 8,620,315 B1* | 12/2013 | Merritt et al. | 455/435.1 |
| 8,780,383 B2* | 7/2014 | Vendrow et al. | 358/1.15 |
| 2003/0055949 A1 | 3/2003 | Coulombe et al. | |
| 2005/0021737 A1* | 1/2005 | Ellison | H04L 67/22 709/224 |
| 2005/0255833 A1* | 11/2005 | Bar-Or | 455/412.1 |
| 2006/0153091 A1 | 7/2006 | Lin et al. | |
| 2007/0115842 A1* | 5/2007 | Matsuda et al. | 370/252 |
| 2007/0217343 A1 | 9/2007 | Znamova et al. | |
| 2008/0146160 A1* | 6/2008 | Jiang et al. | 455/67.11 |
| 2010/0228824 A1* | 9/2010 | Lin | H04L 12/1818 709/204 |
| 2012/0166628 A1* | 6/2012 | Kullos | H04L 41/5016 709/224 |

FOREIGN PATENT DOCUMENTS

| | | |
|---|---|---|
| KR | 10-2007-0023345 | 8/2005 |
| KR | 1020070057624 A | 6/2007 |
| KR | 10-0789904 B1 | 1/2008 |
| WO | 02103630 A2 | 12/2002 |
| WO | 2008138509 A1 | 11/2008 |

* cited by examiner

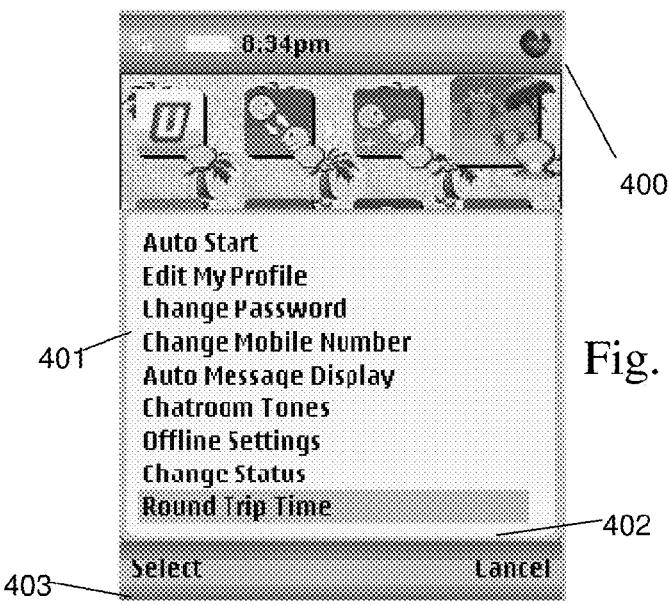
Fig. 5A
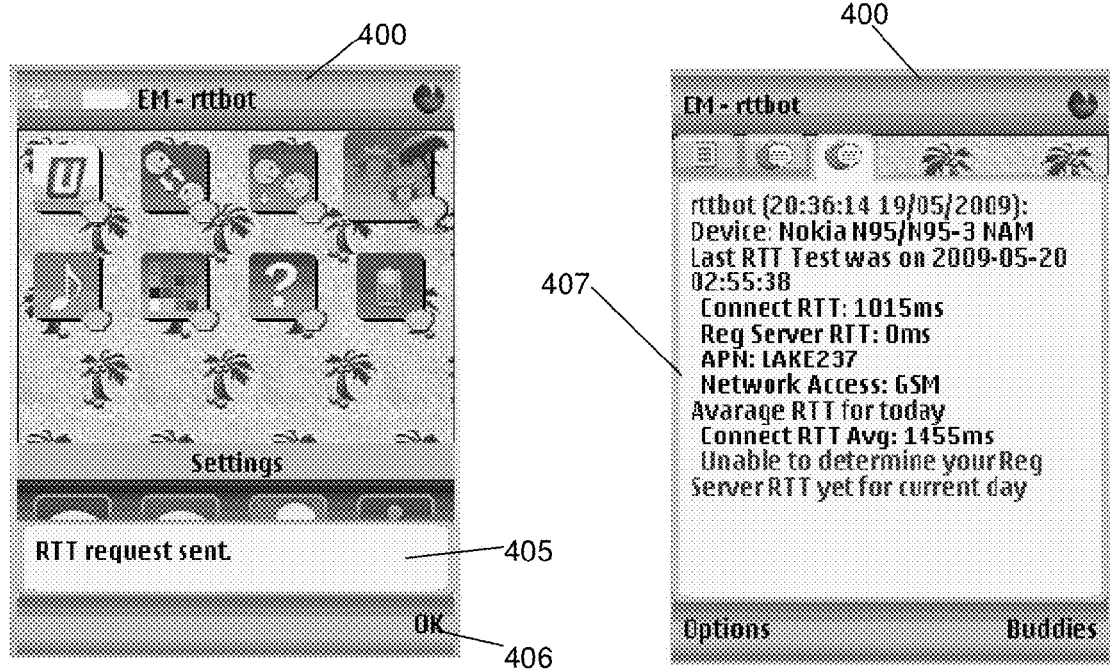
Fig. 5B
Fig. 5C

NETWORK MONITORING AND ANALYSIS TOOL

CROSS-REFERENCE TO RELATED APPLICATIONS

This application is a Continuation Application of U.S. patent application Ser. No. 13/497,391 filed Mar. 21, 2012, which claims the benefit of International Application No. PCT/SG2010/000330 filed Sep. 7, 2010, which claims the benefit of SG Application No. 200906354-6 filed Sep. 24, 2009, the contents of each of which are incorporated herein by reference in their entireties and the benefits of each are fully claimed herein.

FIELD OF THE INVENTION

The present invention relates to systems and methods for analysing the performance of a network. In particular, although not exclusively, the present invention relates to the provision of a network monitoring tool for mobile telecommunication systems.

BACKGROUND

Mobile networks involve a very large number of components ranging from Radio Network Controllers to Gateway GPRS Support Nodes (GGSNs) with numerous firewalls, routers and other devices. Data services through mobile networks, of whatever underlying technology, remain a relatively recent development. Given this, mobile carriers are still developing procedures and tools to allow them to monitor, tune and upgrade these data networks.

Typically carriers are able to implement a wide range of monitors and probes into the infrastructure of the packet core to monitor its performance. However there is no current way to provide ongoing monitoring of the "user experience" where the data network is concerned. A user's experience of data services can vary widely according to location and a various numbers of other factors. For example, a network packet core could be performing extremely well, but if the cell towers are aligned incorrectly then many users in a particular area could experience poor network performance. Providing a consistent user experience in this environment is problematic given the lack of visibility beyond the packet core.

Clearly it would be advantageous to provide a monitoring tool that is capable of providing data on the performance of a network beyond the packet core. It would also be advantageous to provide a monitoring tool which may be deployed as a hidden payload to a carrier supplied mobile messaging client, so as to permit a large volume of tests to be performed across the entire network.

SUMMARY OF THE INVENTION

In one aspect of the present invention there is provided a method for determining the performance of a communications network said method comprising the steps of: transmitting a message from a mobile device to one or more servers configured to direct the message back to the mobile device; receiving at the mobile device the messages returned by the said one or more servers; calculating a time differential between transmission of the message by said mobile device and receipt of the messages returned by the one or more servers by said mobile device; and forwarding the calculated time difference to a primary server selected from said one or more servers for storage.

Suitably the message sent by the mobile device to the one or more servers includes the mobile device's identification number (MIN) which is registered with at least one of the servers. The message is kept sufficiently small to keep the process transparent from the user and to prevent unnecessary overhead that could adversely affect user experience. Suitably the message is more or less in the order of 100 bytes.

Preferably, each of the servers apply a time stamp to the message when directing the message back to the mobile device to permit the monitoring tool to calculate the time for the outbound and inbound legs of the round trip for the message.

The step of transmitting the message may be performed at regular intervals. Suitably the interval between each transmission of the message is set to keep the power consumption required in the process minimal so as not to adversely affect battery life of the mobile device. For example the interval between each transmission may be set to a period of 55 to 61 minutes. The primary server may instruct the mobile test client to vary the length of the interval between each transmission of the message based on network team test requirements or dynamically based on current network performance so as to obtain more detailed test data.

The step of calculating the time differential may further include the steps of calculating the time between the initial send and the subsequent response for each test message. Alternatively the step of calculating the time differential may include the step of calculating a combined/average value for all servers within the one or more servers. Utilizing multiple servers may eliminate issues specific to a single server and allow a network service provider to hone in on a network specific issue rather than a single anomaly within a given sector.

Suitably the step of forwarding the calculated time difference to the primary server further includes forwarding information on the type of mobile device, the application used to send the message, the mode of connection between the mobile device and the communications network, the User ID of the mobile subscriber, the Identification Number of the mobile device etc, cell identification and sector number in which the mobile is located.

The method may further include the step of formulating reports based on the time differential and the type of mobile device, the application used to send the message, the mode of connection between the mobile device and the communications network, the User ID of the mobile subscriber, the Identification Number of the mobile device etc. Preferably the reporting is in the form of an Excel extract of the raw data for 24 hours on a daily basis. Suitably the reports are provided in real-time or near real-time via web page via daily, SMS, email or the like. Preferably, the reports include information identifying performance issues in specific cell sites and cell site sectors to allow carriers to target scarce resources where they can provide most benefit to consumers.

The method may also include the step of forwarding a set time differential to the primary server, the set time interval being indicative of a timeout event wherein the return message from the servers have not been received by the mobile device within a preset period. Preferably the preset period is initially set to 10 minutes, although such preset period may be varied to such period as may be optimal for its purpose. The primary server may vary the preset period in accordance with a variation of the predetermined period. Alternatively a timeout event may be indicated by way of a code in the transaction to the primary server.

Suitably the method may be implemented with no end user interaction. In such cases the mobile device includes a dedicated application which causes the mobile device to send messages to the servers at regular intervals. The application being in communication with the primary server and responsive to instructions transmitted from the server to alter the intervals at which it transmits messages to the servers. Alternatively a method of monitoring may be manually activated by a user of the mobile device via one or more user screens.

Where the method is implemented via a dedicated application installed on the mobile device the application may utilise one or more auxiliary applications on the mobile device to send messages to the one or more servers. The primary server may deactivate the dedicated application when further monitoring is not required. In such instances the servers may set the transmission intervals to a large time frame, for example 9999 minutes. Alternatively the primary server may send a specific instruction to the mobile client application to stop monitoring. Where the test client application is hidden within another application such as a mobile messaging application, the mobile network carrier must ensure no inconvenience results to the consumer. Suitably this would include ensuring the consumer is not charged for any data usage resulting from the monitoring tool. Further, test volumes must be kept to a low level to minimise battery consumption or any other impact on the consumer's mobile experience.

Throughout the specification the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

BRIEF DESCRIPTION OF THE DRAWINGS

In order that this invention may be more readily understood and put into practical effect, reference will now be made to the accompanying drawings, which illustrate preferred embodiments of the invention, and wherein:

FIGS. 5A to 5C are a series of users screens for use in the network monitoring tool according to one embodiment of the present invention.

DETAILED DESCRIPTION

Figure 1:
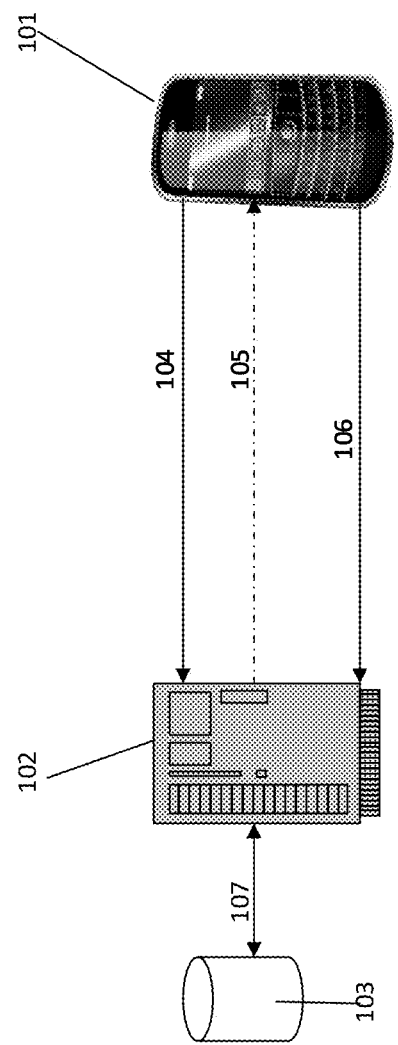
FIG. 1 is a schematic diagram depicting the operation of a network monitoring tool according to one embodiment of the present invention.

With reference to FIG. 1 there is illustrated the operation of a network monitoring tool according to one embodiment of the present invention. In this example the monitoring tool is deployed as an application on a mobile device roaming within a network. As shown the network monitoring tool causes the mobile device 101 to send a message 104 to a server 102 (known as the connect server) associated with the network. The message 104 is at least 100 bytes and contains the mobile device identification number (MIN) which is registered with the connect server 102. Transmitting a message of a reasonable size, such as 100 bytes, ensures that the monitoring tool can, with some degree of accuracy establish a base line for network performance which can be factored into later analysis.

On receipt of the message 104 the connect server 102 immediately forwards the message back 105 to the mobile device 101. The network monitoring tool then calculates the Round Trip Time (RTT) of the message by comparing the time stamps applied by the mobile device to the sent and received messages to determine the total elapsed time. The round trip time information is then forwarded 106 to the connect server 102 for storage in database 107 for logging and reporting purposes.

Figure 2:
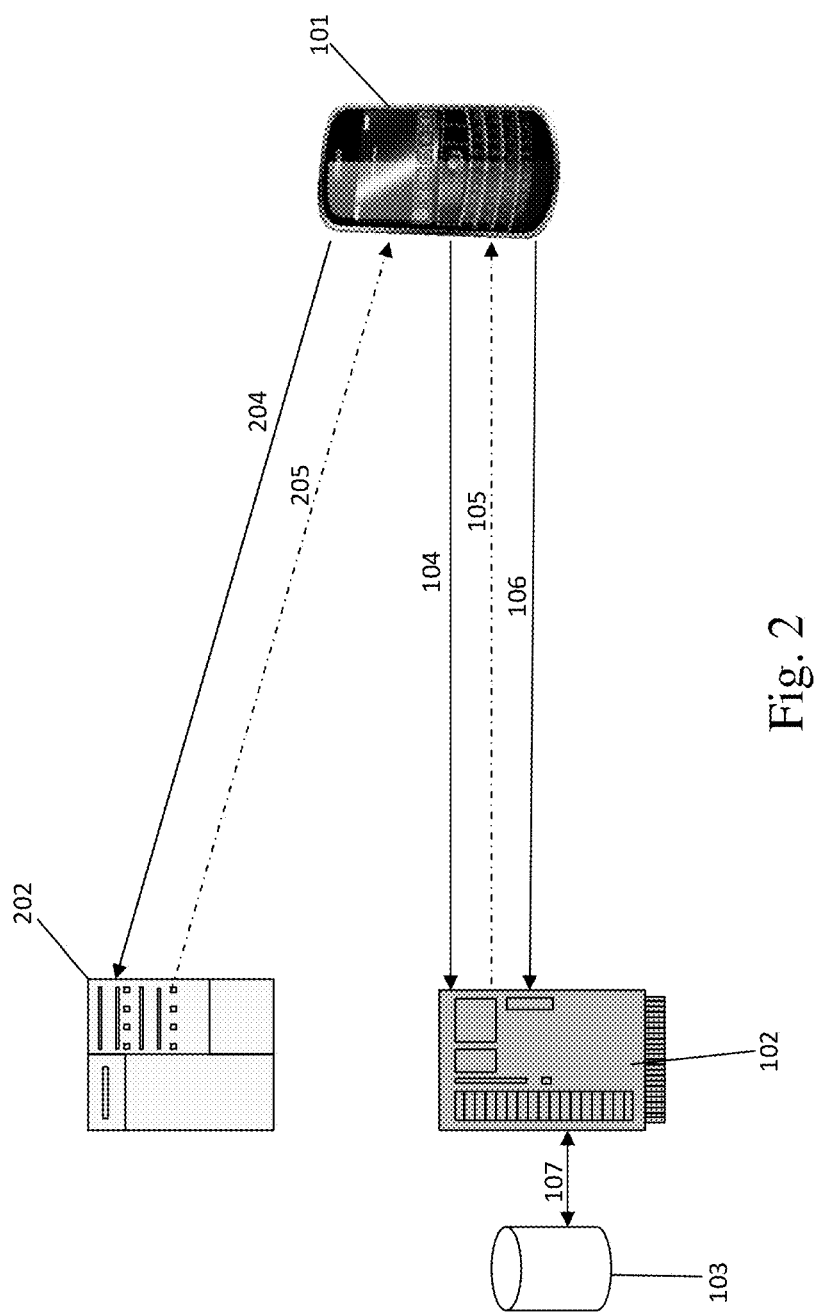
FIG. 2 is a schematic diagram depicting the operation of a network monitoring tool according to a further embodiment of the present invention.

FIG. 2 depicts the operation of a network monitoring tool according to a further embodiment of the present invention. In this particular example the network monitoring tool causes the mobile device 101 to simultaneously send a message 104, 204 to the connect server 102 and a second server 202 known as the dedicated RTT server. On receipt of the message both the connect server 102 and the RTT server 202 forward the message directly back to the mobile device 105, 205. On receipt of the return messages from both the connect and RTT servers 102, 202 the mobile device then proceeds to calculate the Round Trip Time.

While the calculated RTT in this instance may not be an entirely accurate view of the actual RTT, it will however, provide a measure of the general health of the network and once trends are established can be used to identify periods of good or poor performance relative to the baseline.

Figure 3:
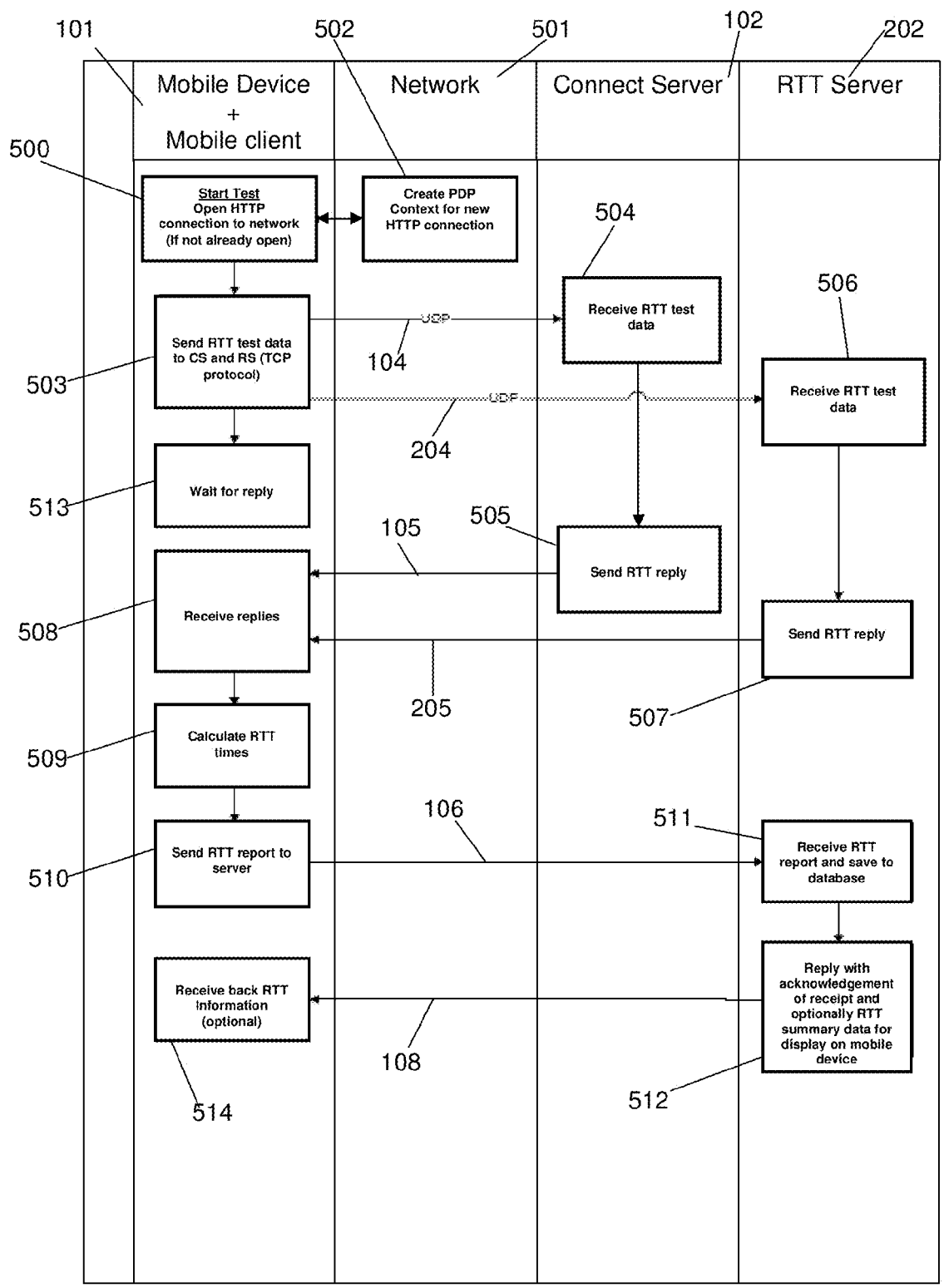
FIG. 3 is a schematic diagram depicting the transaction flow for the network monitoring tool according to one embodiment of the present invention.

FIG. 3 depicts the transaction flow for the RTT calculation and reporting process according to one embodiment of the present invention. As shown the mobile device firstly opens via a mobile client a HTTP connection 500 to the network 501, if one is not already open. The network 501 creates the required Packet Data Protocol (PDP) context for the new HTTP connection 502. Once the HTTP connection is established the mobile client sends 503 RTT test data, in the form of messages 104, 204, to the connect server 102 and RTT server 202 using the TCP protocol. The mobile client then waits 513 for the reply for both the connect and RTT servers 102, 202.

On receipt of the RTT test data 504 the connect server 102 sends an RTT reply 505 in the form of message 105. Likewise the RTT server 202 on receipt of the RTT test data 506 the RTT server 202 sends an RTT reply 507 in the form of message 205. On receipt 508 of the messages 105, 205 the mobile client then calculates the RTT times 509. Once the mobile client has calculated the RTT times it proceeds to send an RTT report 510 to the RTT server 202 via message 106. The RTT server 202 then saves the report 511 to a database. Once this is complete the RTT server 202 may then proceed to send a reply message 512 to the mobile client via message 108. The message 108 may contain RTT summary data which the mobile client can then display 514 on the mobile device's screen.

Figure 4:
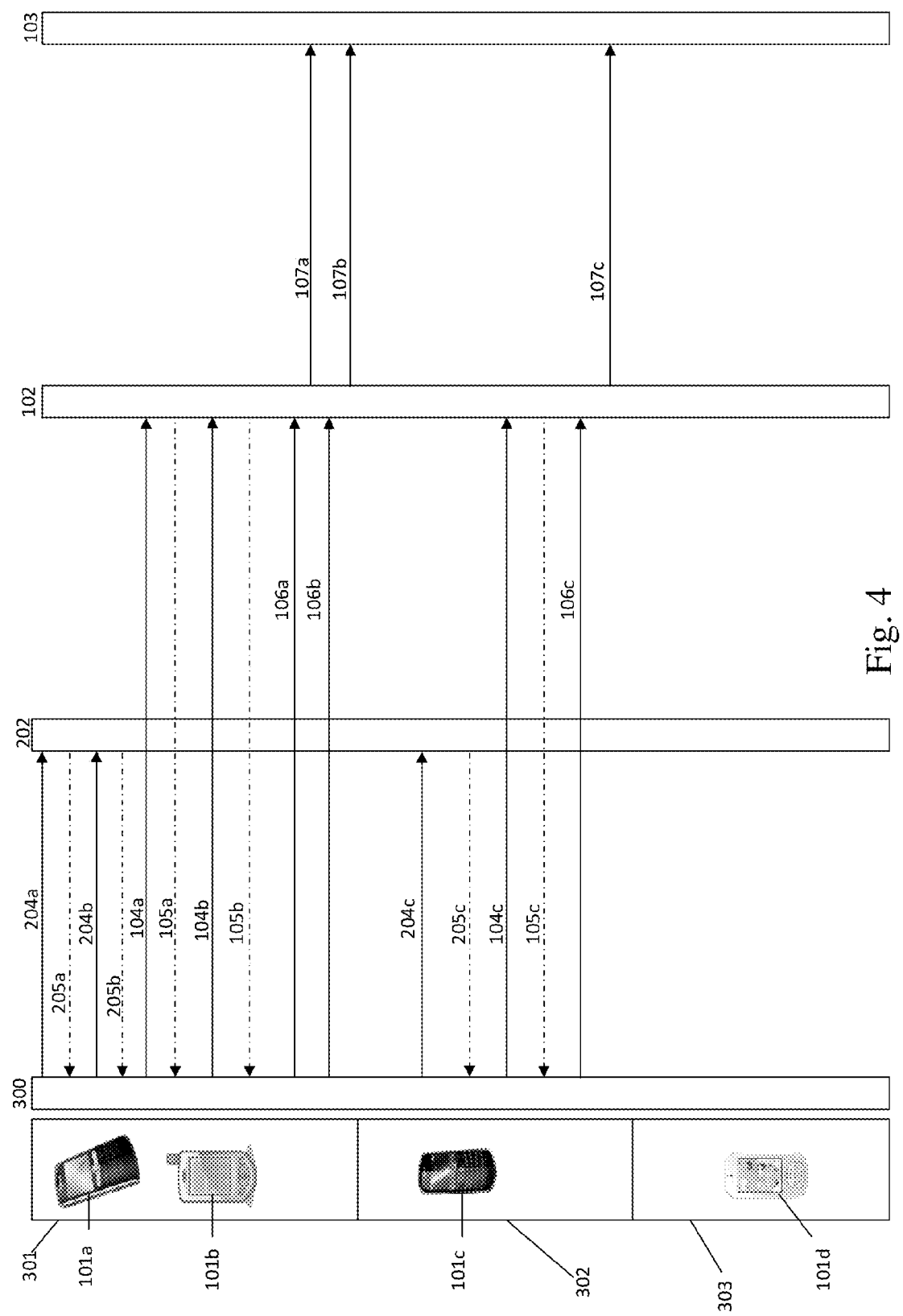
FIG. 4 is a schematic diagram depicting of the operation of a network monitoring tool according to another embodiment of the present invention.

One example of the network monitoring tool in use is shown in FIG. 4. In this case the network monitoring tool is as an application deployed on a plurality of mobile handsets roaming within a mobile communications network. For clarity of description the following discussion will focus on the calculation of the Round Trip Time (RTT) for a single cell with the network servicing plurality of mobile telephones. As shown the cell 300 is composed of three sectors 301, 302, 303. The cell being coupled through the network core to the connect server 102 and the RTT server 202.

In this example the first slot 301 of the cell 300 is servicing two handsets 101a, 101b while the second and third slots 302, 303 each service a single handset 101c, 101d. As shown mobile device 101a, 101b, 101c each send a message 104a, 104b, 104c to the connect server 102 the connect server 102 then forwards each message 105a, 105b, 105c directly back to the respective mobile devices 101a, 101b, 101c. As with the case of the above examples each of the mobile devices running the mobile application may simultaneously send a message 204a, 204b, 204c to the RTT server 202, the RTT server 202 immediately forwards each message back to the relevant mobile devices 205a, 205b, 205c.

Alternatively the network monitoring application may wait for a timer to complete before opening a connection to the RTT server 202. The timer is set to a predetermined time interval, the length of the predetermined time interval is based on a number of factors such as the number of devices being sampled within the network, power consumption of the devices etc. The timer in effect controls the sampling rate for RTT data from the mobile device i.e. dictates send times of the message to facilitate the RTT calculation. In either case the sampling time is kept large given the potential volume of samples that may be taken and to reduce the impact on the mobile device. In the example illustrated in FIG. 4 the predetermined time interval is initially set to a period of 61 minutes. It is proposed that the RTT server may dynamically increase the sampling rate by reducing the predetermined time interval, particular in areas where it can be seen as potential network trouble spots in order to increase the data available on these areas for further analysis.

Since the objective of the monitor is to identify anomalous Round Trip Times, as well as to monitor regular network performance, the timeout for the message to be returned from the RTT server should be set as long as possible given network communication constraints but no longer than the time between tests (i.e. no longer than predetermined period). To ensure "Lag" situations are captured a suitable timeout value would be 10 minutes. A 10 minute timeout period is long enough to capture a typical "lag event" where data transmission is interrupted for a period (for example due to cell congestion). A longer timeout is more likely to result in the user logging out of the device so that the sample is lost. The timeout value should be configurable from the RTT server, however, the timeout set by the RTT server may be overridden by the mobile device if it is longer than the current predetermined interval time (sampling interval). Should the timeout be reached then this data sample should be reported as the timeout time. For example, if the timeout is 10 minutes and no response is received in that time interval then the RTT report should show that sample as 10 minutes for the Round Trip Time.

On receipt of the relevant return messages from the servers 102, 202 each of the mobile devices 101a, 101b, 101c proceeds to calculate the RTT. Once each mobile device 101a, 101b, 101c has calculated the relevant Round Trip Time (RTT) they proceed to forward messages 106a, 106b, 106c containing the relevant RTT information to the connect server 102. In addition to the RTT information, the messages 106a, 106b, 106c also includes the User ID of the mobile subscriber, the Mobile Identification Number (MIN) of the device doing the test, the connection details for the mobile device (GSM/UMTS/etc and Application used), phone model etc. The message may further include information concerning outbound time from the server to the mobile device, inbound time from the mobile device to the server and packet loss i.e. number of packets lost that have to be re-transmitted. A short listing of the desirable information fields for the RTT reporting message is shown in Table 1 below.

Initial reporting will be an excel extract of the raw data for 24 hours on a daily basis from 12:00 midnight to midnight. Server results should be available as follows: Via real time web page; via daily reports (see layout below); Via excel format extracts (see layout and options below); via real time alert SMS to a defined list of mobile numbers when thresholds are breached. The reports indicate the spread of RTT times by cell site/sector. Thus it is possible to identify sites or sectors that are experiencing higher than acceptable RTT times. These sites should then be targeted for more detailed analysis by the network team.

TABLE 1

| RTT Reporting Message Fields | |
| --- | --- |
| Report Field | Description/Purpose |
| Time/date | Time/date report was sent from client (this will be shortly after the ping however is more consistent than using the time of the mobile device). |
| User ID | User logged on to this client |
| MIN | Mobile Identification Number |
| APN | Application used to send RTT message (could be Smart1, Smart Internet or any other carriers Application) |
| Mode (2G/3G/3.5G) | Ensure system can cater for future e.g. LTE, WiFi, Other? |
| RTT to Connect server | In ms |
| RTT to RTT server | In ms |
| Phone Model | Only Symbian s60/$3^{rd}$ at present |

The server has the option to turn off the RTT testing from either for all or selected user ID's. In particular it should be possible to only have the tool turned on for specific users. This can be simply achieved by setting the RTT timer interval to 9999 minutes.

In one iteration of the tool, the monitoring client software is incorporated into a messaging application which, in a Symbian s60 phone is designed to operate as "always on" and connected to the mobile internet. The messaging application provides a framework that supports sending and receiving messages as well as optionally providing RTT reporting back to the mobile user by way of EM type messages. EM stands for Extended Messaging and is a proprietary form of Internet based instant messaging.

In the production version of the tool, no RTT information is to be visible to the mobile client user. In test versions, however, a user is to be able to select Round Trip time, from the Settings menu which will result in a transaction being sent to the server requesting current RTT information. This information is provided in an EM type response from the RTT Bot. FIG. 5A to 5C depict a series of user screens 400 of a test version of the network monitoring tool according to one embodiment of the present invention.

As illustrated in FIG. 5A the user has activated an options menu 401 within the display screen 400. To commence testing the user highlights the option 'Round Trip Time' from the listing 402 and the presses the select button 403. Once the Round Trip Time is selected, a message 405 is displayed on the user screen informing the user that the RTT request has been sent as shown in FIG. 5B. In order to dismiss the message, the user then selects the OK button 406.

After the monitoring tool has calculated the round trip time from the information obtained from the return messages, the relevant information is then displayed to the user 407 (see FIG. 5C). As illustrated in the example of FIG. 5C the RTT reporting message in this instance includes the date and time at which the sample was taken, the phone model, the date and time of the previous test, the RTT for the current test (connect RTT and Reg RTT), the application used, type of network access (in this case GSM) and the average RTT for the day (average connect RTT and average Reg RTT).

As mentioned above the analysis tool may be utilised to identify lag events within the network. In such instances each message transaction to another mobile is treated somewhat like the RTT test data discussed above.

Under lag testing conditions the sending client records the time when it sent each message (ts) and then records the time when the acknowledgment is received. The client is then able to calculate the duration (td) since original message was sent to the other client. This RTT time may be impacted by any kind of network issues including lag. The impact could be either the sending device or the receiving device.

To optimize the amount of data captured by such a testing approach the client compares the duration td with a reporting threshold value (for example 3 minutes). If td exceeds the threshold, then the sending client transmits a notification to the RTT server to be stored and collated. Suitably the lag threshold, as with all similar parameter data, should be easily modifiable and may be set by the RTT server. The report may include such information as, the userid of sender and receiver, td (effectively RTT to the other client), cell site of reporting client (if known), phone model of reporting client and the MIN of sender and receiver.

It will be appreciated by those of skill in the art that the lag testing may also be performed at the connect server. Initiating testing in this manner would allow the server to calculate response times for every transaction as well as to identify which device of a pair is actually experiencing lag.

It is to be understood that the above embodiments have been provided only by way of exemplification of this invention, and that further modifications and improvements thereto, as would be apparent to persons skilled in the relevant art, are deemed to fall within the broad scope and ambit of the present invention described herein.

What is claimed is:

1. A method for determining a performance of a communications network comprising a mobile device installed with a monitoring tool, the method comprising steps of:
   transmitting messages from the mobile device to a plurality of servers at regular intervals set to a predetermined time period, wherein the plurality of servers are configured to direct the messages back to the mobile device;
   receiving at the mobile device the messages returned by the plurality of servers;
   calculating a time differential between transmission of the messages by the mobile device and receipt of the messages returned by the plurality of servers, by the mobile device;
   forwarding the calculated time differential to a primary server selected from the plurality of servers for storage; and wherein a secondary server selected from the plurality of servers is configured to dynamically vary length of the predetermined time period using the calculated time differential.

2. The method of claim 1 wherein the messages sent by the mobile device to the plurality of servers include the mobile device's identification number (MIN).

3. The method of claim 2 wherein the mobile device's identification number is registered with the primary server.

4. The method of claim 1 wherein the plurality of servers are configured to apply a time stamp to the messages when directing the messages back to the mobile device.

5. The method of claim 4 wherein the step of calculating further includes a step of calculating a transit time for the messages to reach the plurality of servers.

6. The method of claim 4 wherein the step of calculating further includes a step of calculating transit time for the messages to reach the mobile device from the plurality of servers.

7. The method of claim 1 wherein the time differential is indicative of total round trip time for the messages.

8. The method of claim 1 wherein the secondary server is configured to dynamically vary the length of the predetermined time period based on variations in the calculated time differential.

9. The method of claim 1 wherein the step of forwarding the calculated time differential to the primary server further includes forwarding information on a type of the mobile device, an application used to send the messages, a mode of connection between the mobile device and the communications network, a User ID of a mobile subscriber, the mobile device's identification number, cell identification and sector number in which the mobile device is located.

10. The method of claim 9 further including a step of formulating reports for one or more cells within the network based on the time differential and the information on the type of the mobile device, the application used to send the messages, the mode of connection between the mobile device and the communications network, the User ID of the mobile subscriber, the mobile device's identification number.

11. The method of claim 1 further including a step of forwarding a set time differential to the primary server on an expiry of a preset period for receipt by the mobile device of return messages from the plurality of servers.

12. The method of claim 8 wherein the secondary server is further configured to vary a preset period in accordance with a variation of the predetermined time period.

13. A mobile device, the mobile device including a dedicated application for performing a method for determining a performance of a communications network comprising the mobile device installed with a monitoring tool, the method comprising steps of:
   transmitting messages from the mobile device to a plurality of servers at regular intervals set to a predetermined time period, wherein the plurality of servers are configured to direct the messages back to the mobile device;
   receiving at the mobile device the messages returned by the plurality of servers;
   calculating a time differential between transmission of the message by the mobile device and receipt of the messages returned by the plurality of servers by the mobile device;
   forwarding the calculated time differential to a primary server selected from the plurality of servers for storage; and wherein a secondary server selected from the plurality of servers is configured to dynamically vary length of the predetermined time period using the calculated time differential.

14. The mobile device of claim 13 wherein the dedicated application utilizes one or more auxiliary applications on the mobile device to send the messages to the plurality of servers.

15. The mobile device of claim 13 wherein the dedicated application is incorporated as an embedded application in a host application installed on the mobile device.

16. The mobile device of claim 15 wherein the host application includes messaging capabilities and the dedicated application is configured to use the messaging capabilities of the host application to provide feedback to a user regarding the calculated time differential.

17. The mobile device of claim 13, the dedicated application can be deactivated by the plurality of servers.

* * * * *